United States Patent
Matsumoto

(10) Patent No.: US 7,289,088 B2
(45) Date of Patent: Oct. 30, 2007

(54) ELECTROLUMINESCENT DISPLAY DEVICE

(75) Inventor: Shoichiro Matsumoto, Ogaki (JP)

(73) Assignee: Sanyo Electric Co., Ltd., Osaka (JP)

(*) Notice: Subject to any disclaimer, the term of this patent is extended or adjusted under 35 U.S.C. 154(b) by 606 days.

(21) Appl. No.: 10/948,742

(22) Filed: Sep. 24, 2004

(65) Prior Publication Data
US 2005/0093466 A1 May 5, 2005

(30) Foreign Application Priority Data
Sep. 30, 2003 (JP) ............................. 2003-340650

(51) Int. Cl.
*G09G 3/30* (2006.01)
(52) U.S. Cl. ........................................ 345/76; 345/77
(58) Field of Classification Search ................. 345/76, 345/77, 173, 35, 36, 158, 178–183, 89; 315/169.3; 178/18.01, 18.03, 18.05–18.07; 356/621; 353/122; 341/13; 250/205; 362/545
See application file for complete search history.

(56) References Cited

U.S. PATENT DOCUMENTS

| | | | | |
|---|---|---|---|---|
| 4,673,918 A | * | 6/1987 | Adler et al. .................. 341/13 |
| 4,988,837 A | * | 1/1991 | Murakami et al. ....... 178/18.07 |
| 5,220,409 A | * | 6/1993 | Bures ......................... 356/621 |
| 5,738,429 A | * | 4/1998 | Tagawa et al. ............. 353/122 |
| 6,914,595 B1 | * | 7/2005 | Kobayashi et al. ......... 345/179 |
| 7,098,592 B2 | * | 8/2006 | Nishikawa ................... 313/506 |
| 7,133,032 B2 | * | 11/2006 | Cok .......................... 345/175 |
| 7,195,381 B2 | * | 3/2007 | Lynam et al. ............... 362/494 |
| 2005/0067553 A1 | * | 3/2005 | Agari et al. ................ 250/205 |
| 2005/0110777 A1 | * | 5/2005 | Geaghan et al. ............ 345/179 |
| 2005/0168134 A1 | * | 8/2005 | Nishikawa ................... 313/500 |
| 2006/0066537 A1 | * | 3/2006 | Kimura et al. ................ 345/76 |

FOREIGN PATENT DOCUMENTS

| | | |
|---|---|---|
| JP | 2001-290604 A | 10/2001 |
| JP | 2002-175029 | 6/2002 |
| JP | 2002-214583 | 7/2002 |

* cited by examiner

*Primary Examiner*—Prabodh Dharia
(74) *Attorney, Agent, or Firm*—Morrison & Foerster LLP

(57) ABSTRACT

An organic electroluminescent (EL) display device has a touch panel function and includes a display panel that has first and second light sources disposed along sides of the display portion and first and second light detecting portions disposed on sides of the display portion opposite the light sources. The display device includes a plurality of organic EL display elements disposed in a matrix on the display portion and a plurality of organic EL light source elements disposed in a row in each of the light source portions. The light detecting portions include a plurality of detection light sensors and a reference light sensor disposed in a row in each of the light detecting portions. The display device also includes a comparator that compares an output of the detection light sensors with the output of the reference light sensor.

16 Claims, 5 Drawing Sheets

ELECTROLUMINESCENT DISPLAY DEVICE

CROSS-REFERENCE OF THE INVENTION

This invention is based on Japanese Patent Application No. 2003-340650, the content of which is incorporated by reference in its entirety.

BACKGROUND OF THE INVENTION

1. Field of the Invention

This invention relates to an electroluminescent display device, particularly to an electroluminescent display device having a touch panel function.

2. Description of the Related Art

In recent years, organic electroluminescent (hereafter, referred to as EL) display devices using EL elements have been receiving attention as a display device substituting for a CRT or an LCD. Particularly, organic EL display devices having thin film transistors (hereafter, referred to as TFTs) as switching elements for driving the organic EL elements have been developed.

The LCD has a wide range of applications, for example, from displays for cellular phones to those for personal digital assistants. Furthermore, a touch panel used with a finger or a pen-type pointing device has been developed. Such technologies are disclosed in Japanese Patent Application Publication Nos. 2002-175029 and 2002-214583.

However, the organic EL display device has not been applied to touch panels used with the finger or the pen-type pointing device.

SUMMARY OF THE INVENTION

This invention provides an organic EL display device having a touch panel function, and is directed to improving accuracy in positional detection on a display portion of such an organic EL display device. An organic EL display device of the invention is formed with a display portion by disposing display pixels each having a display organic EL element in a matrix. A first light source portion having a plurality of light source organic EL elements is provided, being disposed along a first side of the display portion. A first light detecting portion having a plurality of detection light sensors is provided, being disposed along a side opposite from the first side. Similarly, a second light source portion having a plurality of light source organic EL elements is provided, being disposed along a second side of the display portion. A second light detecting portion having a plurality of detection light sensors is provided, being disposed along a side opposite from the second side.

Reference light sensors are provided in the first and second light detecting portions. Furthermore, comparators for comparing outputs of the reference light sensors and outputs of the detection light sensors are provided in the first and second light detecting portions. The display portion, the first and second light source portions, and the first and second light detecting portions are formed on the same substrate.

In this invention, an organic EL display device having a touch panel function can be realized in one display panel. This reduces the number of components in the display device, and the display device can be miniaturized. Furthermore, detection of a x coordinate and a y coordinate of a point P on the display portion is performed by comparing outputs of the detection light sensors and outputs of the reference light sensors in the light detecting portions by the comparators so that accuracy in the detection of the x and y coordinates improves.

DETAILED DESCRIPTION OF THE INVENTION

Figure 1A:
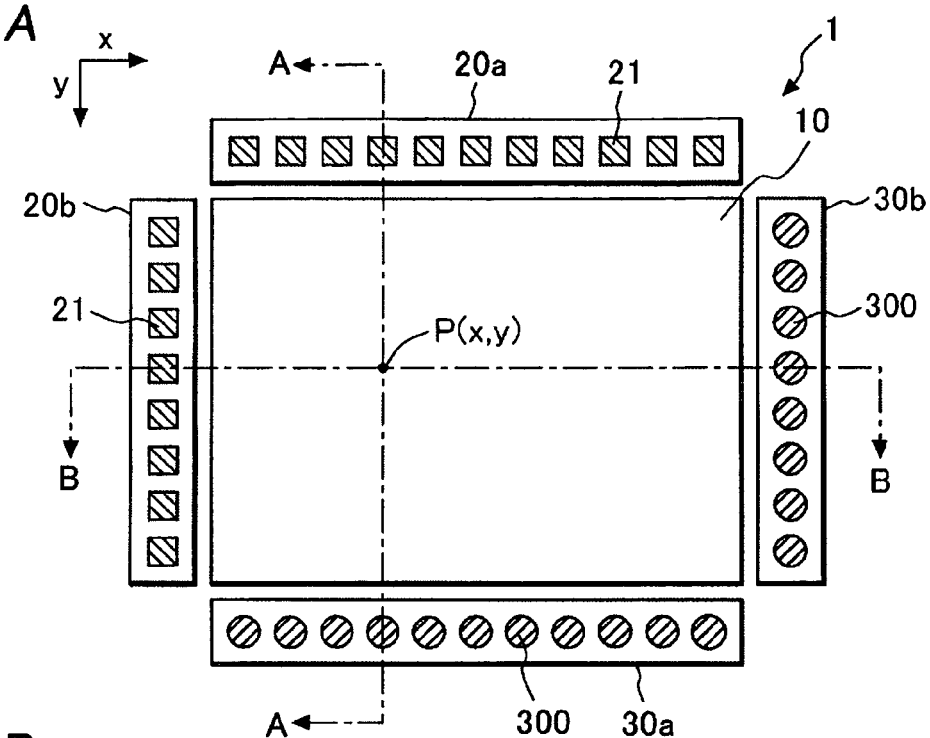
FIG. 1A is a plan view of an organic EL display device of an embodiment of the invention.
Figure 1B:
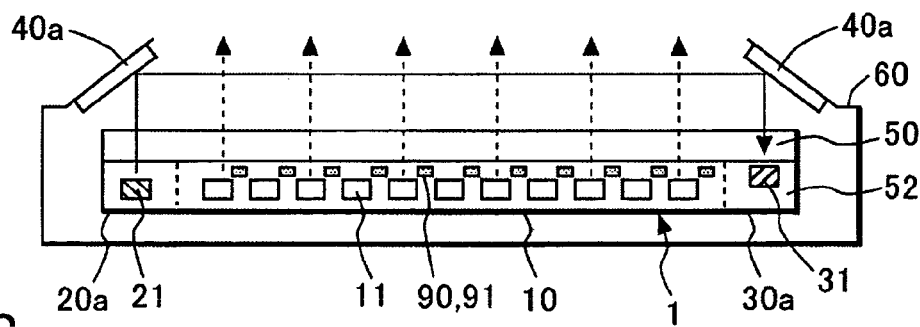
FIG. 1B is a cross-sectional view of FIG. 1A along line A-A.
Figure 1C:
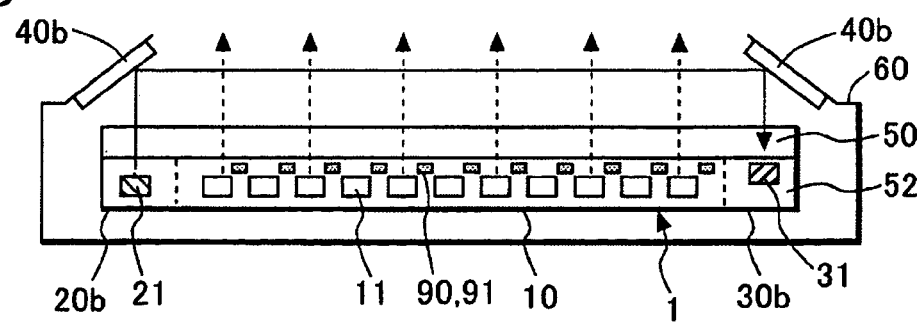
FIG. 1C is a cross-sectional view of FIG. 1A along line B-B.
Figure 2A:
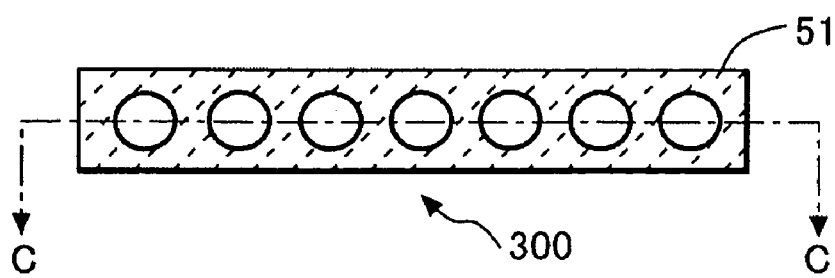
FIG. 2A shows an upper surface of one of blocks in first and second light detecting portions of FIGS. 1A, 1B and 1C.
Figure 2B:
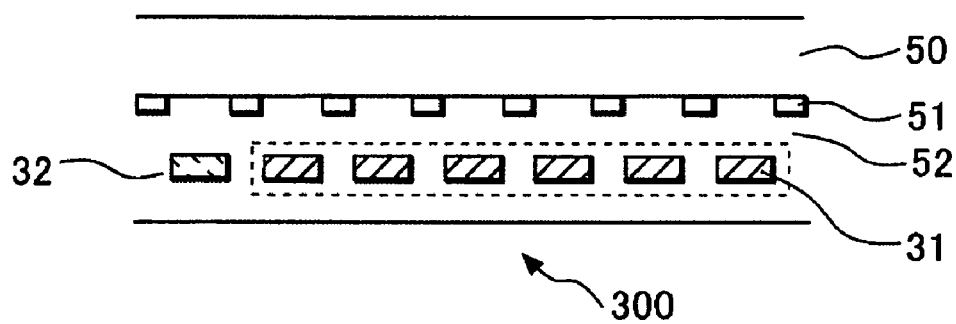
FIG. 2B is a cross-sectional view of FIG. 2A along line C-C.
Figure 4:
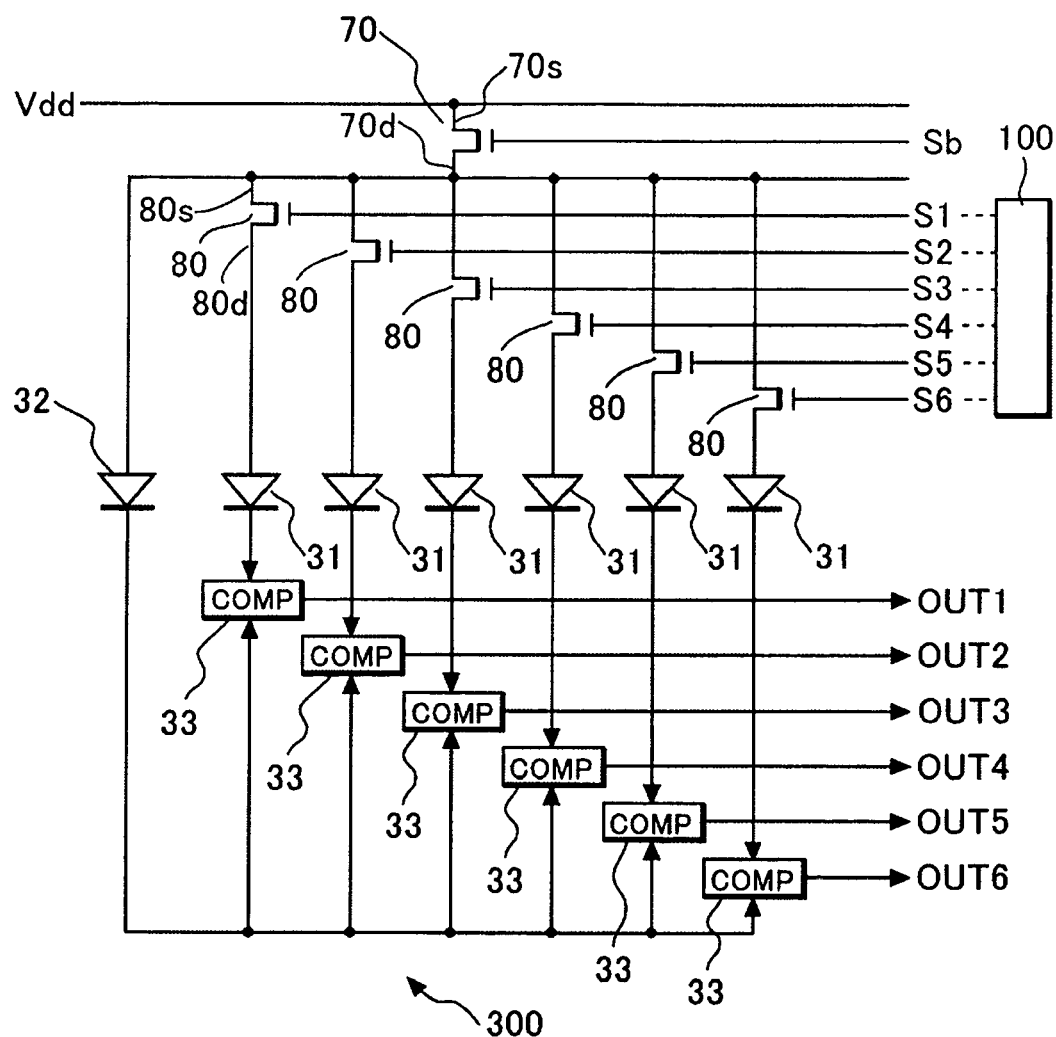
FIG. 4 is an equivalent circuit diagram of one of the blocks in the first and second light detecting portions of FIGS. 2A and 2B.

A structure of an organic EL display device of one embodiment of the invention will be described with reference to the drawings. FIG. 1A is a plan view of the organic EL display device of this embodiment. FIG. 1B is a cross-sectional view of FIG. 1A along line A-A. FIG. 1C is a cross-sectional view of FIG. 1A along line B-B. FIG. 2A shows an upper surface of one of blocks 300 in first and second light detecting portions 30a and 30b, and FIG. 2B is a cross-sectional view of FIG. 2A along line C-C. A block 300 of the light detecting portions 30a and 30b is a segment of a corresponding light detecting portion that includes a plurality of detection light sensors 31 and a reference light sensor 32, as explained below. FIG. 4 is an equivalent circuit diagram of one of blocks 300 in the first and second light detecting portions 30a and 30b.

In this embodiment, in a display portion 10 of a display panel 1, a plurality of display pixels (not shown) is disposed in a matrix. Each of the display pixels includes a display organic EL element 11, a pixel selecting TFT 90 (thin film transistor), a driving TFT 91 for driving the display organic EL element 11, and so on.

As shown in FIG. 1A, the display portion 10 has a rectangle shape in the plan view, and provided with a first light source portion 20a along a first side of the display portion 10. A plurality of light source organic EL elements 21 is aligned in the first light source portion 20a.

Furthermore, a first light detecting portion 30a is provided along a side opposite from the first side of the display portion 10. The first light detecting portion 30a is divided in a plurality of blocks 300 along the side opposite from the first side of the display portion 10, and a plurality of detection light sensors 31 (e.g. photodiodes) is arranged in each of the blocks 300. These detection light sensors 31 generate predetermined currents or voltages as outputs when receiving light, and the currents or the voltages are electrically detected so that the light can be detected.

The plurality of the detection light sensors 31 in each of the blocks 300 is respectively connected with a plurality of comparators 33 provided as many pieces as the number of the detection light sensors 31 (FIG. 4). An output (current or voltage) of each of the detection light sensors 31 is inputted to each of the comparators 33.

Furthermore, a reference light sensor 32 (e.g. photodiode) is provided in an end of a row of the detection light sensors 31 in each of the blocks 300 of the first light detecting portion 30a. This reference light sensor 32 generates a predetermined current or voltage as an output when receiving light, and the current or the voltage is electrically detected so that the light can be detected.

The reference light sensor 32 is connected with all the comparators 33 in the block 300 (FIG. 4). An output (current or voltage) of the reference light sensor 32 is commonly inputted to all the comparators 33.

Similarly, a second light source portion 20b is placed along a second side of the display portion 10. A plurality of light source organic EL elements 21 is aligned in the second light source portion 20b.

A second light detecting portion 30b is provided along a side opposite from the second side of the display portion 10. The second light detecting portion 30b is divided in a plurality of blocks 300 along the side opposite from the second side of the display portion 10, and a plurality of detection light sensors 31 (e.g. photodiodes) is aligned in each of the blocks 300. The plurality of the detection light sensors 31 in each of the blocks 300 is respectively connected with a plurality of comparators 33 provided as many pieces as the number of the detection light sensors 31 (FIG. 4). An output (current or voltage) of each of the detection light sensors 31 is inputted to each of the comparators 33.

Furthermore, a reference light sensor 32 (e.g. photodiode) is provided in an end of a row of the detection light sensors 31 in each of the blocks 300 of the second light detecting portion 30b. The reference light sensor 32 is connected with all the comparators 33 in the block 300 (FIG. 4). An output (current or voltage) of the reference light sensor 32 is commonly inputted to all the comparators 33.

A pair of first light reflecting boards 40a is provided above the first light source portion 20a and the first light detecting portion 30a (FIG. 1B).

One of these first light reflecting boards 40a reflects light, which is emitted in a vertical direction through a glass substrate 50 from the light source organic EL element 21 of the first light source portion 20a, in a horizontal direction along the glass substrate 50.

When this light is not blocked by a pointing object PT (FIGS. 3A-3C) such as a pen or a finger which touches or is placed close to the display portion 10, another of the first light reflecting boards 40a then reflects the light in a vertical direction through the glass substrate 50, and the reflected light enters the first light detecting portion 30a.

A pair of second light reflecting boards 40b is provided above the second light source portion 20b and the second light detecting portion 30b (FIG. 1C).

One of these second light reflecting boards 40b reflects light, which is emitted in a vertical direction through the glass substrate 50 from the light source organic EL element 21 of the second light source portion 20b, in a horizontal direction along the glass substrate 50.

When this light is not blocked by the pointing object PT, which touches or is placed close to the display portion 10, another of the second light reflecting boards 40b then reflects the light in a vertical direction through the glass substrate 50, and the reflected light enters the second light detecting portion 30b.

Here, the display portion 10 provided with the plurality of the display organic EL elements 11, the first and second light source portions 20a and 20b and the first and second light detecting portions 30a and 30b are placed in an insulating film 52 on the same glass substrate 50, being integrally formed in a display panel 1.

That is, the light source organic EL elements 21 of the first and second light source portions 20a and 20b have the same structure as that of the display organic EL elements 11 of the display portion 10 so that the light source organic EL elements 21 and the display organic EL elements 11 are formed by the same manufacturing steps. Furthermore, the detection light sensors 31 and the reference light sensors 32 of the first and second light detecting portions 30a and 30b can be formed of TFTs so that the detection light sensors 31 and the reference light sensors 32 can be formed by the same manufacturing steps as the steps for manufacturing the pixel selecting TFTs 90 and the driving TFTs 91 in the display portion 10.

Furthermore, when a drive circuit is provided in the display panel 1, i.e. on the glass substrate 50, to supply signals to the pixel selecting TFTs 90 and the driving TFTs 91, the detection light sensors 31 and the reference light sensors 32 are also simultaneously formed by the same manufacturing steps as the steps for manufacturing the TFTs in the drive circuit.

This display panel 1 is stored in a storage container 60, and the display portion 10 is exposed through an opening of the storage container 60. This display panel 1 is thus configured to emit display light of the display portion 10 outside.

Next, description will be made on a typical structure (not shown) of the display organic EL element 11 of the display portion 10 and the light source organic EL element 21 of the first and second light source portions 20a and 20b.

For a so-called bottom emission type, in which an EL element emits light through the substrate formed with an EL element, the display organic EL element 11 and the light source organic EL element 21 include a first electrode, a hole transport layer, an emissive layer, an electron transport layer and a second electrode in this order. The first electrode is a transparent electrode made of ITO (indium tin oxide) and so on. The hole transport layer is formed of a first hole transport layer made of MTDATA (4,4-bis (3-methylphenylphenylamino) biphenyl) and a second hole transport layer made of TPD (4,4,4-tris (3-methylphenylphenylamino) triphenylamine). The emissive layer is made of Bebq2(bis(10-hydroxybenzo[h]quinolinato)beryllium) containing quinacridone, and the electron transport layer is made of Bebq2. The second electrode is made of magnesium indium alloy, aluminum or aluminum alloy.

In these display organic EL element 11 and the light source organic EL element 21, holes injected from the first electrode and electrons injected from the second electrode are recombined inside the emissive layer. These recombined holes and electrons activate organic molecules forming the emissive layer to generate excitons. Light is emitted from the emissive layer in a process of radiation of the excitons, and then released outside after going through the transparent first electrode to the glass substrate 50, thereby completing light-emission.

Next, a structure of the first and second light detecting portions 30a and 30b is described with reference to FIGS. 2A and 2B. FIG. 2A shows an upper surface of one of the blocks 300 in the first and second light detecting portions 30*a* and 30*b*. FIG. 2B is a cross-sectional view of FIG. 2A along line C-C.

As shown in FIG. 2A, in each of the blocks 300 in the first and second light detecting portions 30*a* and 30*b*, a light shielding film 51 having openings in positions corresponding to the plurality of detection light sensors 31 and the reference light sensor 32 is formed.

That is, as shown in FIG. 2B, the light shielding films 51 are formed on the glass substrate 50. The light shielding films 51 are formed only between the adjacent detection light sensors 31 and reference light sensor 32.

An insulating film 52 is further formed, and the plurality of the detection light sensors 31 and the reference light sensor 32 are formed in the insulating film 52. Although exterior light enters the first and second light detecting portions 30*a* and 30*b* from an outside of the display panel 1, these light shielding films 51 can block (or reduce) the exterior light from reaching the detection light sensors 31 and the reference light sensor 32. This can improve accuracy in detection by the plurality of the detection light sensors 31 and the reference light sensor 32.

Next, a detection process of a point P corresponding to a position where the pointing object PT touches or is placed close to the display portion 10 will be described with reference to FIGS. 1A, 1B, 1C, 2A, 2B, 3A, 3B and 3C.

The coordinates (x, y) of this point P are determined as follows. Assume that the x coordinate corresponds to the first side of the display portion 10, and the y coordinate corresponds to the second side of the display portion 10. Furthermore, light emitted from each of the light source organic EL elements 21 of the first and second light source portions 20*a* and 20*b* has directivity similar to those of laser beams.

First, the x coordinate of the point P is determined as described below. Light emitted in a vertical direction through the glass substrate 50 from each of the light source organic EL elements 21 of the first light source portion 20*a* is reflected in a horizontal direction along the glass substrate 50 by one of the first light reflecting boards 40*a*. When the light is not blocked by the pointing object PT, the light is then reflected in a vertical direction through the glass substrate 50 by another of the first light reflecting boards 40*a* to enter the first light detecting portion 30*a*.

The light entering the first light detecting portion 30*a* is detected by the detection light sensors 31 corresponding to the position where the light enters. Each of the outputs of the detection light sensors 31 is compared with the output of the reference light sensor 32 by each of the comparators 33.

The reference light sensor 32 is kept being irradiated with light from the light source organic EL element 21 when the display device is in operation. Therefore, the output (current or voltage) of the detection light sensor 31 and the output (current or voltage) of the reference light sensor 32 are substantially equal. The comparator 33 outputs a predetermined voltage (high level) so as to indicate that light is detected at the detection light sensor 31 in this position.

On the other hand, light emitted by the light source organic EL element 21 is blocked by the pointing object PT in a position where the pointing object PT touches or is placed close to the display portion 10. Therefore, the intensity of light detected by the detection light sensor 31 in this position is lower than the intensity of light detected by the reference light sensor 32.

The output (current or voltage) of the detection light sensor 31 in this position is compared with the output (current or voltage) of the reference light sensor 32 by the comparator 33 connected with this detection light sensor 31.

Since the output of the detection light sensor 31 in this position is lower than the output of the reference light sensor 32, the comparator 33 outputs a predetermined voltage (low level). The position of the detection light sensor 31 connected with this comparator 33 is the x coordinate of the point P on the display portion 10.

In a similar manner, the y coordinate of the point P is determined as described below. Light emitted in a vertical direction through the glass substrate 50 from each of the light source organic EL elements 21 of the second light source portion 20*b* is reflected in a horizontal direction along the glass substrate 50 by one of the second light reflecting boards 40*b*. When the light is not blocked by the pointing object PT, the light is then reflected in a vertical direction through the glass substrate 50 by another of the second light reflecting boards 40*b* to enter the second light detecting portion 30*b*.

The light entering the second light detecting portion 30*b* is detected by the detection light sensors 31 corresponding to the positions where the light enters. Each of outputs of the detection light sensors 31 is compared with an output of the reference light sensor 32 by each of the comparators 33.

The reference light sensor 32 is kept being irradiated with light from the light source organic EL element 21. Therefore, the output (current or voltage) of the detection light sensor 31 and the output (current or voltage) of the reference light sensor 32 are substantially equal. At this time, the comparator 33 outputs a predetermined voltage (high level) so as to indicate that light is detected at the detection light sensor 31 in this position.

On the other hand, light emitted by the light source organic EL element 21 is blocked by the pointing object PT in a position where the pointing object PT touches or is placed close to the display portion 10. Therefore, the intensity of light detected by the detection light sensor 31 in this position is lower than the intensity of light detected by the reference light sensor 32.

The output (current or voltage) of the detection light sensor 31 in this position is compared with the output (current or voltage) of the reference light sensor 32 by the comparator 33 connected with this detection light sensor 31.

Since the output of the detection light sensor 31 in this position is lower than the output of the reference light sensor 32, the comparator 33 outputs a predetermined voltage (low level). The position of the detection light sensor 31 connected with this comparator 33 is the y coordinate of the point P on the display portion 10.

When light emitted from each of the light source organic EL elements 21 of the first and second light source portions 20*a* and 20*b* does not have a directivity similar to those of laser beams, the x and y coordinates of the point P (x, y) can be determined as described below.

That is, the x and y coordinates of the point P (x, y) are determined by sequentially switching the light source organic EL elements for emitting light, and by monitoring the positions of the detection light sensors which do not detect the light each time. A process of determining the x and y coordinates of the point P (x, y) in this case will be described with reference to FIGS. 3A, 3B and 3C.

Figure 3A:
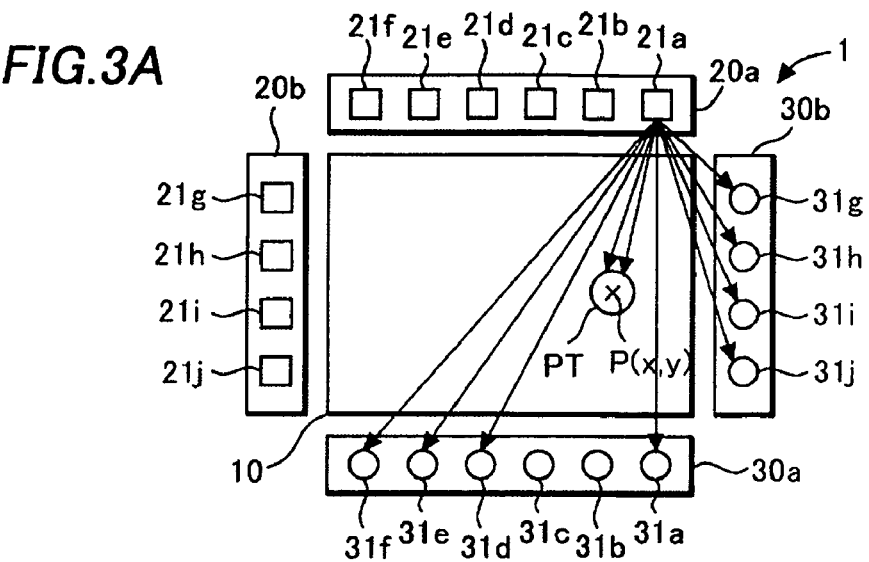
FIGS. 3A, 3B and 3C are schematic plan views of a display panel showing an operation of the organic EL display device of FIGS. 1A, 1B, and 1C.
Figure 3B:
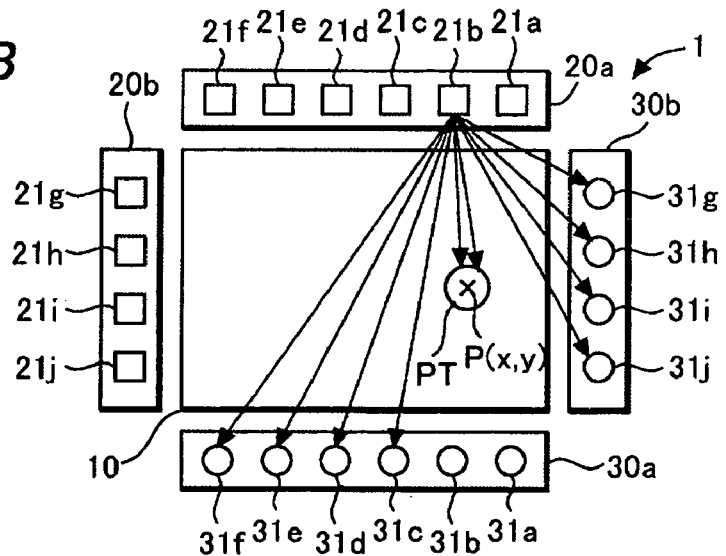
Figure 3C:
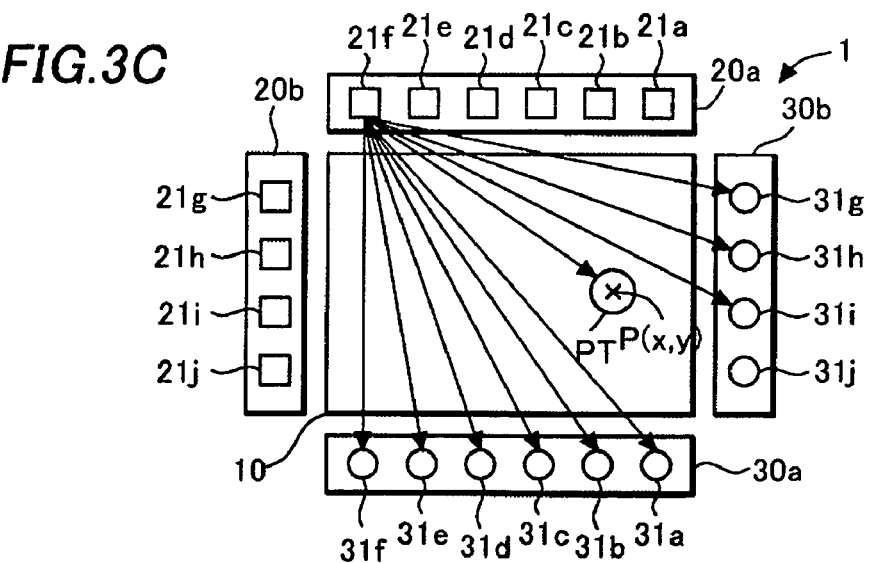

FIGS. 3A, 3B and 3C are schematic plan views of the display panel 1 explaining an example of a process of determining the x and y coordinates of the point P (x, y) under the divergent light source. In FIGS. 3A, 3B and 3C, the number of the light source organic EL elements and the detection light sensors is reduced from the number shown in FIG. 1A for simplifying description.

As shown in FIG. 3A, light is emitted in a vertical direction through the glass substrate 50 (not shown) from a light source organic EL element 21*a* provided in one end of the first light source portion 20*a*. This light is reflected in a horizontal direction along the glass substrate 50 by the first light reflecting board 40*a* (not shown) provided above the first light source portion 20*a*. When the light reflected in a horizontal direction is not blocked by the pointing object PT, the light is then reflected in a backside direction of the display panel 1 by the first light reflecting board 40*a* (not shown) provided above the first light detecting portion 30*a* to enter the first light detecting portion 30*a*.

Furthermore, the light is reflected in the backside direction of the display panel 1 by the second light reflecting board 40*b* (not shown) provided above the second light detecting portion 30*b* to enter the second light detecting portion 30*b*. The light entering the first and second light detecting portions 30*a* and 30*b* is detected by the detection light sensors corresponding to positions where the light enters (detection light sensors 31*a*, 31*d*, 31*e*, 31*f*, 31*g*, 31*h*, 31*i*, and 31*j* in an example of FIG. 3A).

On the other hand, when the light reflected in a horizontal direction is blocked by the pointing object PT, the light is blocked by the pointing object PT so that the light does not enter the first and second light detecting portions 30*a* and 30*b*. That is, the detection light sensors (detection light sensors 31*b* and 31*c* in an example of FIG. 3A) corresponding to positions where the light does not enter do not detect the light.

Accordingly, the detection light sensors which do not detect the light are searched among the detection light sensors of the first and second light detecting portions 30*a* and 30*b*, and x coordinates or y coordinates of those light sensors are stored in a storage medium (not shown) such as a memory. When this operation is completed, the light source organic EL element 21*a* is turned off the light.

Next, as shown in FIG. 3B, light is emitted from a light source organic EL element 21*b* adjacent the light source organic EL elements 21*a*. Then, x coordinates or y coordinates of the detection light sensors (detection light sensors 31*a* and 31*b* in an example of FIG. 3B) which do not detect the light among the detection light sensors of the first and second light detecting portions 30*a* and 30*b* are stored in the memory (not shown) and so on. When this operation is completed, the light source organic EL element 21*b* is turned off.

Similarly, light source organic EL elements 21*c*, 21*d*, 21*e* and 21*f* placed adjacent each other in the first light source portion 20*a* are sequentially switched to emit light and turn off the light. The detection light sensors which do not detect the light are searched each time, and x coordinates or y coordinates of the detection light sensors are stored in the memory (not shown) and so on. As shown in FIG. 2C, when light is emitted from the light source organic EL element 21*f*, an x coordinate or a y coordinate of the detection light sensor (detection light sensor 31*j* in an example of FIG. 2C) which does not detect the light is stored in the memory (not shown) and so on.

After a sequence of light emission and turn-off is completed from the light source organic EL element 21*a* provided on one end of the first light source portion 20*a* to the light source organic EL element 21*f* provided on another end thereof, the light emission and turn-off in the second light source portion 20*b* are sequentially performed from the light source organic EL element 21*g* provided on one end thereof to the light source organic EL element 21*j* provided on another end thereof. At each time of this operation, the detection light sensors which do not detect the light are searched in the first and second light detecting portions 30*a* and 30*b*, and x or y coordinates corresponding to the detection light sensors are monitored and stored in the memory and so on (not shown).

As described above, the detection light sensors of the first and second light detecting portions 30*a* and 30*b*, which do not detect the light emitted from the first and second light source portions 20*a* and 20*b*, are searched. The x coordinate or the y coordinate corresponding to each of the detected detection light sensors is monitored each time, and stored in the memory (not shown) and so on.

Then, the x or y coordinates of the detection light sensors which do not detect the light, which are monitored and stored each time, are used to determine the x and y coordinates of the point P (x, y) representing the location of the pointing object PT that touches or is placed close to the display portion 10. Then, the data stored in the memory and so on are initialized for next detection of the point P (x, y).

It is noted that the reference light sensor 32 can be prevented from being kept irradiated with light by shielding the light with the light shielding film 51.

The detection of the x and y coordinates of the point P described above is performed in each of the blocks 300 of the first and second light detecting portions 30*a* and 30*b*. Such detection will be described below with reference to FIG. 4.

A block switching signal line Sb to be supplied with a signal for selecting the blocks 300 (e.g. high level or low level) is connected with a gate of a block selecting TFT (thin film transistor) 70. A source 70*s* of the block selecting TFT 70 is connected with a power supply voltage Vdd for supplying power to the detection light sensors 31 and the reference light sensor 32. A drain 70*d* of the block selecting TFT 70 is connected with a plurality of sources 80*s* of light sensor selecting TFTs 80 and also connected with the reference light sensor 32 (e.g. photodiode) provided in the same block 300.

The gates of the light sensor selecting TFTs 80 are respectively connected with switching signal lines S1, S2, S3, S4, S5 and S6 for supplying a signal for switching on each of the detection light sensors 31 in order. The drains 80*d* of the light sensor selecting TFTs 80 are respectively connected with the plurality of the detection light sensors 31 (e.g. photodiode).

The detection light sensors 31 are respectively connected with the input terminals on one sides of the comparators 33. The input terminals on another sides of the comparators 33 are commonly connected with the reference light sensor 32. Output lines OUT1, OUT2, OUT3, OUT4, OUT5, and OUT6 extend from the comparators 33 respectively.

Next, a switching operation of the blocks 300 and the detection light sensors 31 in each of the first and second light detecting portions 30*a* and 30*b* will be described. It is noted that the block selecting TFT 70 and the light sensor selecting TFTs 80 are of N-channel type in this eobodiment.

In one of the blocks 300 of the first light detecting portion 30*a* and the second light detecting portions 30*b*, which is selected first, when the block switching signal line Sb becomes high level, the block selecting TFT 70 turns on. Then, the power supply voltage Vdd is supplied to the sources 80*s* of the light sensor selecting TFTs 80.

At the same time, the power supply voltage Vdd is also supplied to the reference light sensor 32. Therefore, the reference light sensor 32 keeps outputting a voltage corresponding to an amount of received light while the block switching signal line Sb is being high level.

All the switching signal lines S1 to S6 are low level, first. No power supply voltage Vdd is supplied to all the detection light sensors 31 at this time, so that outputs of all the detection light sensors 31 are low level. Therefore, in all the comparators 33, the outputs of the reference light sensor 32 are higher than the outputs of the detection light sensors 31, so that outputs of all the output lines OUT1 to 6 are low level.

Next, the switching signal line S1 of the first light sensor selecting TFT 80 becomes high level, and the detection light sensor 31 corresponding to the light sensor selecting TFT 80 connected thereto is selected.

Then, an output of the detection light sensor 31 and an output of the reference light sensor 32 are compared by the comparator 33 to detect the x and y coordinates of the point P described above. A predetermined voltage (high level or low level) is outputted as a result of the comparison by the comparator 33 by the output line OUT 1.

For example, when the selected detection light sensor 31 does not receive the emitted light and the reference light sensor 32 receives the light, the output voltage of the detection light sensor 31 lowers so that the output of the comparator 33 becomes low level. When the selected detection light sensor 31 receive the light, the output of the comparator 33 becomes high level.

Then, the switching signal line S1 becomes low level, and the light sensor selecting TFT 80 thereof turns off. The next switching signal line S2 adjacent to the switching signal line S1 becomes high level, and thus the light sensor selecting TFT 80 connected to the switching signal line S2 turns on.

Switching of the light sensor selecting TFTs 80 and detection of the x and y coordinates of the point P described above are repeated until the switching signal line S6 is operated on to activate the corresponding sensor. After the completion, the block switching signal line Sb in this block 300 becomes low level, and the next block 300 adjacent thereto is selected.

That is, the block switching signal line Sb in the next block 300 becomes high level, the reference light sensor 31 in this block 300 turns on, and the plurality of the drains of the light sensor selecting TFTs 80 is supplied with a current from the power supply voltage Vdd.

The switching of the light sensor selecting TFTs 80 and detection of the x and y coordinates of the point P to be performed hereafter are the same as in the first block 300. The block switching operation described above is repeated until the last block 300.

The switching of the light sensor selecting TFTs 80 described above can be performed by supplying a signal to the switching signal lines S1 to S6 in order by using a shift resistor 100 connected with the switching signal lines S1 to S6 so that the detection light sensors 31 can be activated in this order.

In the embodiment described above, the detection light sensors 31 and the reference light sensor 32 are photodiodes. However, each of the detection light sensors 31 or (and) the reference light sensor 32 can be formed of a plurality of photodiodes connected in parallel. A structure of the first and second light detecting portions 30a and 30b in this case will be described with reference to drawings in FIG. 5.

Figure 5:
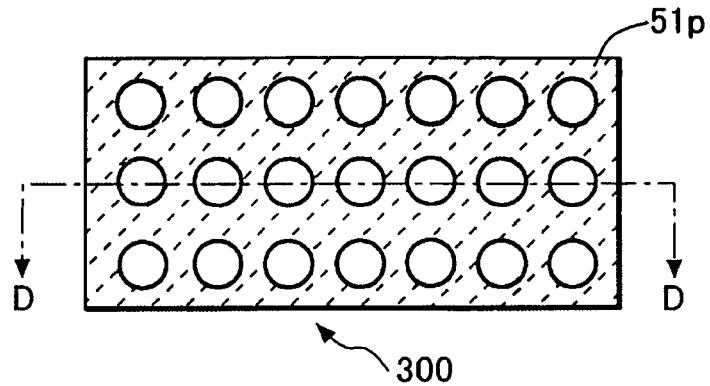
FIG. 5 shows an upper surface of one of the blocks in the first and second light detecting portions of FIGS. 1A, 1B and 1C.
Figure 6:
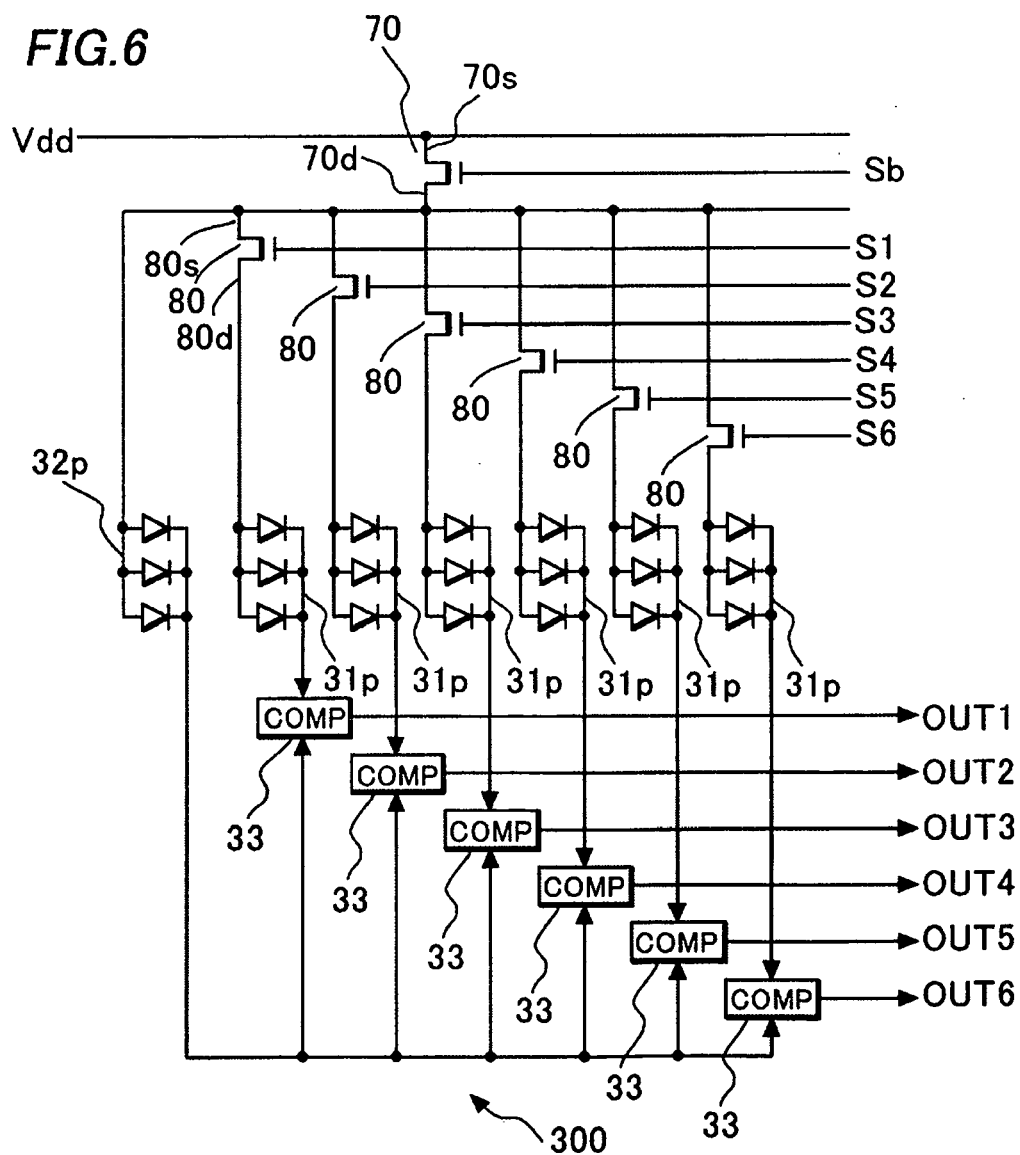
FIG. 6 is an equivalent circuit diagram of one of the blocks in the first and second light detecting portions of FIG. 5.

FIG. 5 is a view showing an upper surface of one of the blocks 300 in the first and second light detecting portions 30a and 30b when the detection light sensors 31 and the reference light sensor 32 include a plurality of the photodiodes connected in parallel. FIG. 6 is an equivalent circuit diagram of one of the blocks 300 in the first and second light detecting portions 30a and 30b.

As shown in FIG. 5, a light shielding film 51p is provided, having openings in a position corresponding to the detection light sensors 31p and the reference light sensor 32p, each having the plurality of photodiodes connected in parallel. A cross-sectional view of FIG. 5. along line D-D is similar to FIG. 2B.

As shown in FIG. 6, each of the detection light sensors 31p and the reference light sensor 32p is formed of the photodiodes connected in parallel. This increases each of signals of the detection light sensors 31p and the reference light sensor 32p so that accuracy in light detection improves and thus accuracy in detection of the x and y coordinates of the point P described above improves.

In the embodiment described above, each of the detection light sensors 31 and 31p and the reference light sensors 32 and 32p has a plurality of photodiodes. However, each of the detection light sensors 31 and 31p or (and) the reference light sensors 32 and 32p can include photoelectric devices other than photodiodes.

Although the display device of the above embodiment is an active matrix display device in which TFTs are formed in each of pixels, the invention is not limited to this but the display device can be a passive matrix display device in which TFTs are not formed in each of pixels.

The above embodiment can be applied to an EL display device of bottom emission type in which light emitted from an EL element is released outside through the glass substrate 50 formed with an EL element. Furthermore, the embodiment can be applied to an EL display device of top emission type, in which light emitted from an EL element is released through the glass substrate opposite from the glass substrate having TFTs thereon.

Although the openings formed in the light shielding films 51 and 51P are shaped in a circle, the invention is not limited to this but the openings can have other shapes as long as the openings can transmit light from the light source organic EL element 21 and block external light.

As described above, the light source for detecting the pointing object includes the same organic EL element as that used for the display organic EL element 11. Therefore, it is unnecessary to form the light source for detecting the pointing objects separately using other element. Accordingly, both the display and light source organic EL elements can be formed simultaneously. It is noted that the light source organic EL elements may also be formed separately from the display organic EL elements, for example, when different light intensities are required for the two different types of organic EL elements.

Since the light sensors (detection light sensors 31 and 31p and reference light sensors 32 and 32p) include TFTs, the light sensors and the pixel can be formed simultaneously in the active matrix EL display device having TFTs in each of pixels.

Furthermore, the above embodiment can be applied to a non-organic EL element having an emissive layer made of non-organic materials.

Accordingly, the EL display device having the described touch panel function can be realized without increasing the number of steps.

What is claimed is:

1. An electroluminescent display device comprising:
   a display portion comprising a plurality of display electroluminescent elements disposed in a matrix;

a first light source portion comprising a plurality of light source electroluminescent elements disposed along a first side of the display portion;

a first light detecting portion comprising a plurality of detection light sensors disposed along a side opposite from the first side;

a second light source portion comprising a plurality of light source electroluminescent elements disposed along a second side of the display portion;

a second light detecting portion comprising a plurality of detection light sensors disposed along a side opposite from the second side;

a reference light sensor disposed in the first light detecting portion or the second light detecting portion; and a comparator connected to the reference light sensor and at least two of the detection light sensors of a corresponding light detecting portion in which the reference light sensor is disposed.

2. The electroluminescent display device of claim 1, wherein the display portion, the first and second light source portions and the first and second light detecting portions are disposed on a substrate.

3. The electroluminescent display device of claim 1, wherein each of the detection light sensors and the reference light sensor comprises a photodiode.

4. The electroluminescent display device of claim 1, wherein each of the detection light sensors and the reference light sensor comprises a plurality of photodiodes connected in parallel.

5. The electroluminescent display device of claim 1, wherein the electroluminescent display device is of active type having a switching element in each of the display electroluminescent elements, and the switching elements and the detection light sensors have a same structure.

6. The electroluminescent display device of claim 1, wherein the display electroluminescent elements and the light source electroluminescent elements have a same structure.

7. The electroluminescent display device of claim 1, wherein the detection light sensors and the reference light sensor have a same structure.

8. The electroluminescent display device of claim 1, further comprising a shift resistor that activates the detection light sensors sequentially.

9. An electroluminescent display device comprising:

a display portion comprising a plurality of display electroluminescent elements disposed in a matrix;

a first light source portion comprising a plurality of light source electroluminescent elements disposed along a first side of the display portion;

a first light detecting portion comprising a plurality of detection light sensors disposed along a side opposite from the first side;

a second light source portion comprising a plurality of light source electroluminescent elements disposed along a second side of the display portion;

a second light detecting portion comprising a plurality of detection light sensors disposed along a side opposite from the second side;

a pair of first light reflecting boards for leading light emitted by the first light source portion to the first light detecting portion;

a pair of second light reflecting boards for leading light emitted by the second light source portion to the second light detecting portion;

a reference light sensor disposed in the first light detecting portion or the second light detecting portion; and a comparator connected to the reference light sensor and at least two of the detection light sensors of a corresponding light detecting portion in which the reference light sensor is disposed.

10. The electroluminescent display device of claim 9, wherein the display portion, the first and second light source portions and the first and second light detecting portions are disposed on a substrate.

11. The electroluminescent display device of claim 9, wherein each of the detection light sensors and the reference light sensor comprises a photodiode.

12. The electroluminescent display device of claim 9, wherein each of the detection light sensors and the reference light sensor comprises a plurality of photodiodes connected in parallel.

13. The electroluminescent display device of claim 9, wherein the electroluminescent display device is of active type having a switching element in each of the display electroluminescent elements, and the switching elements and the detection light sensors have a same structure.

14. The electroluminescent display device of claim 9, wherein the display electroluminescent elements and the light source electroluminescent elements have a same structure.

15. The electroluminescent display device of claim 9, wherein the detection light sensors and the reference light sensor have a same structure.

16. The electroluminescent display device of claim 9, further comprising a shift resistor that activates the detection light sensors sequentially.

* * * * *